United States Patent [19]
Aubertin et al.

[11] Patent Number: 5,965,074
[45] Date of Patent: Oct. 12, 1999

[54] CONTINUOUS PASTE EXTRUSION METHOD

[75] Inventors: Fabrice Aubertin, Segny, France; Daniel N. Levy, Collex, Switzerland

[73] Assignee: E.I. du Pont de Nemours and Company, Wilmington, Del.

[21] Appl. No.: 09/022,945

[22] Filed: Feb. 12, 1998

Related U.S. Application Data

[60] Provisional application No. 60/038,401, Feb. 17, 1997.

[51] Int. Cl.[6] .................................................. B29C 47/00
[52] U.S. Cl. ......................... 264/112; 264/109; 264/127; 425/380; 425/381
[58] Field of Search .................................. 264/109, 112, 264/127, 120; 425/380, 381

[56] References Cited

U.S. PATENT DOCUMENTS

| | | | |
|---|---|---|---|
| 2,685,707 | 8/1954 | Llewellyn et al. | 18/55 |
| 3,260,774 | 7/1966 | Harlow | 264/28 |
| 4,576,869 | 3/1986 | Malhotra | 428/502 |
| 5,225,131 | 7/1993 | Tamaru et al. | 264/127 |
| 5,505,887 | 4/1996 | Zdrahaka et al. | 264/127 |
| 5,518,676 | 5/1996 | De Rocheprise | 264/127 |

*Primary Examiner*—Mary Lynn Theisen

[57] ABSTRACT

Paste extrusion of lubricated PTFE fine powder is carried out by using the extrusion head of the extruder as the ram for forcing the powder through the extrusion orifice in the extrusion head, i.e. the extrusion head is moved against the powder, whether in particle form or preform form, to cause the extrusion.

10 Claims, 6 Drawing Sheets

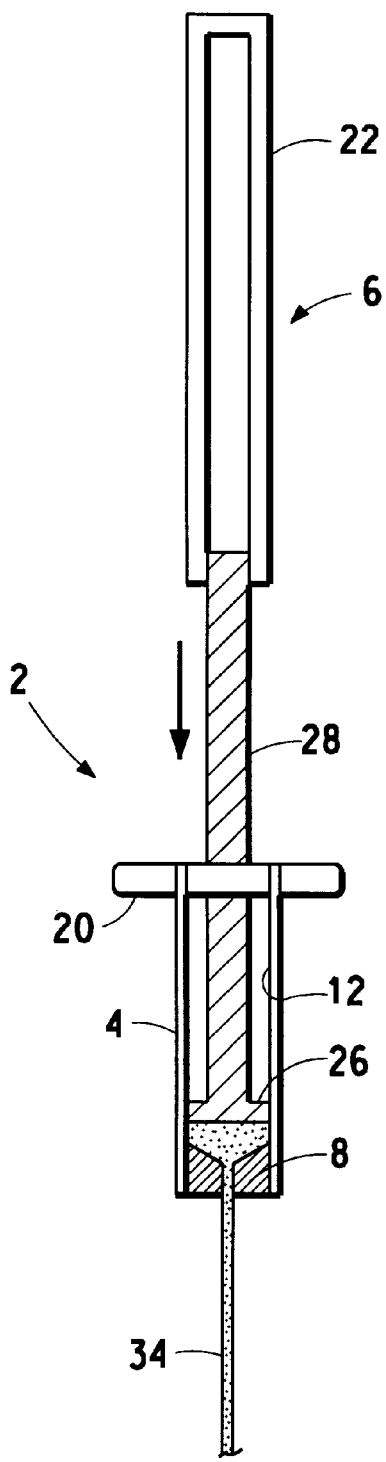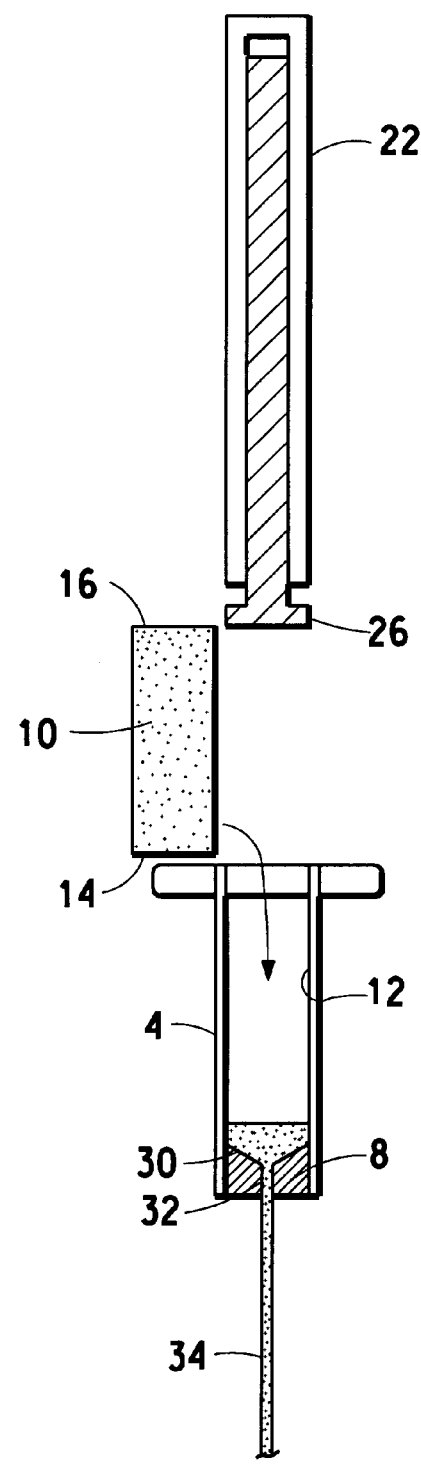
FIG. 1
(PRIOR ART)
FIG. 2
(PRIOR ART)

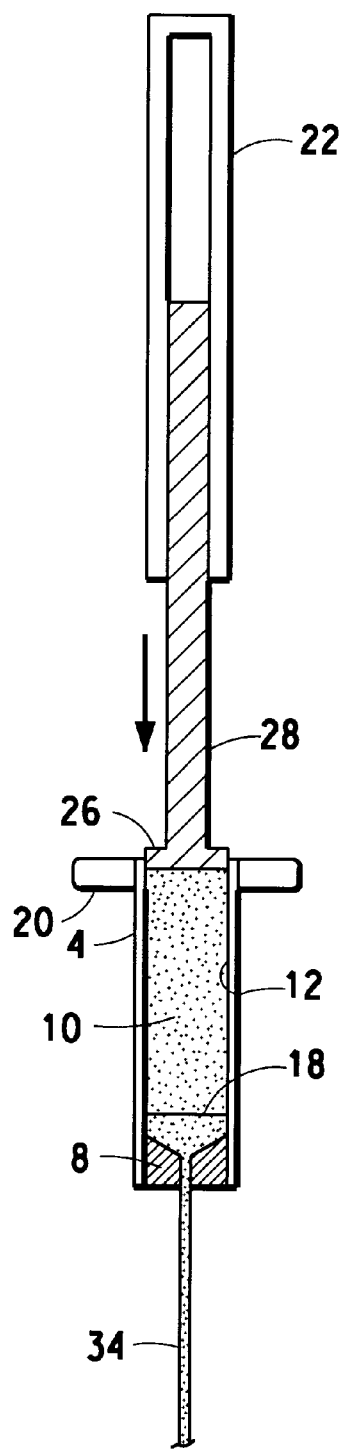 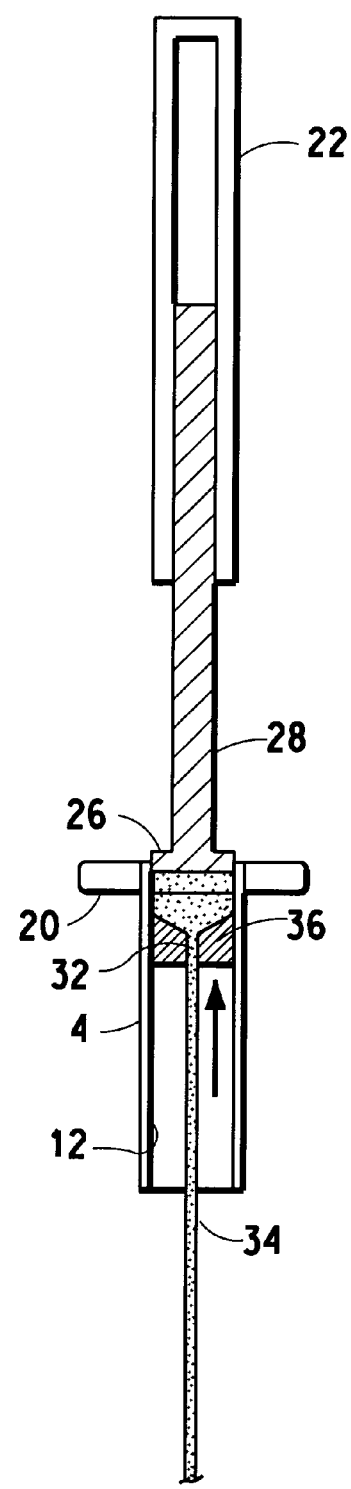
FIG. 3
(PRIOR ART)
FIG. 4

CONTINUOUS PASTE EXTRUSION METHOD

RELATED APPLICATIONS

This application claims the benefit of Provisional Application No. 60/038,401, filed Feb. 17, 1997.

FIELD OF INVENTION

This invention relates to paste extrusion of lubricated polytetrafluoroethylene fine powder.

BACKGROUND OF THE INVENTION

Polytetrafluoroethylene (PTFE) fine powder is the type of PTFE that is made by aqueous dispersion polymerization, followed by coagulation of the dispersion, and drying of the resultant coagulum to obtain the fine powder. Because the PTFE fine powder does not flow in the melt condition (m.p. 327° C.), it has been fabricated by an extrusion method which does not require melt flow.

This extrusion method is known as paste extrusion and is described for example in U.S. Pat. No. 2,685,707 (Llewellyn and Lontz). In paste extrusion, the paste extrusion composition is formed by mixing the PTFE fine powder with an organic lubricant which has a viscosity of at least 0.45 centipoises at 25° C. and is liquid under the conditions of subsequent extrusion. The PTFE soaks up the lubricant, resulting in a dry, pressure coalescing mixture, which is the paste extrusion composition, or simply, the lubricated PTFE fine powder. The lubricated PTFE fine powder is placed in an extrusion barrel which terminates in an extrusion head which defines an extrusion orifice. The powder is then "paste extruded" by a ram positioned at the opposite end of the extrusion barrel moving towards the extrusion orifice to force the lubricated PTFE fine powder through the orifice in such form as sheet, rod, tubing, or coating such as on a wire fed axially along the extrusion barrel and through the center of the orifice. The paste extrusion has usually been carried out at a temperature of 20 to 40° C. In most cases, the paste extrudate is then heated to volatilize the lubricant, usually to a temperature of 100 to 250° C., to drive off the lubricant from the extrudate, followed by sintering of the PTFE.

Example 1 of the '707 patent discloses the paste extrusion of the lubricated PTFE fine powder fed as a powder to the extrusion barrel, followed by calendering the paste extrudate to form tape. Example 2 discloses the paste extrusion of lubricated PTFE fine powder fed as a preform to the extrusion barrel, i.e. the lubricated PTFE fine powder is pre-compacted in a mold into a shape which is complementary to the extrusion barrel. After loading the preform into the extrusion barrel, the ram forces the preform towards and through the extrusion orifice into the extruded shape desired. This has been the method used to form paste extrudate which is not subsequently calendered. Thus, U.S. Pat. No. 4,576, 869 (Malhotra), which discloses a highly advantageous PTFE fine powder for paste extrusion, discloses the preforming of the lubricated PTFE fine powder before paste extruding it.

Paste extrusion using the preform method is necessarily a batch or discontinuous extrusion operation. When the preform is used up, the extrusion must be stopped, the ram retracted, and another preform loaded into the extrusion barrel. The trailing end of the preceding preform is still in the extrusion barrel, just upstream from the extrusion head, and the leading end of the succeeding preform is forced into contact with the trailing end, whereby there is a junction between the two preforms within the barrel. Exertion of the ram against succeeding preform causes this junction to be paste extruded. Unfortunately, this junction does not knit together very well in the paste extrudate and this is not cured by sintering. Calendering cannot be used when the shape of the extrudate is the shape desired for the final product, e.g. rod, tubing, and coated wire. Thus for any extrudate applications, the continuity of the extrudate has to be interrupted where the junction occurs in the paste extrudate. The same is true when the powder feed method to the extrusion barrel is used and the extrudate is not calendered. The pressure of the ram compacting the powder also forms a junction with a subsequent batch of lubricated PTFE fine powder, and this junction does not have the integrity of the surrounding paste extrudate.

The need exists for paste extrudability of PTFE lubricated fine powder wherein the junction between batches of the fine powder fed to the extrusion barrel has integrity in the resultant paste extrudate, without requiring calendering. If this need could be satisfied, the paste extrudate could be continuous. U.S. Pat. No. 3,260,774 discloses continuous extrusion of PTFE fine powder using an extrusion screw and special temperature profile in the extruder, but this process suffered from the difficulty in maintaining the special temperatures required, and the action of the screw on the fine powder injured the fragile fine powder, giving inferior extrudate, with the result being that this process is not believed to be in use.

SUMMARY OF THE INVENTION

The present invention satisfies the need for a continuous paste extrudate by the process of carrying out the paste extrusion of the lubricated polytetrafluoroethylene fine powder by moving the extrusion head against the fine powder to cause the fine powder to extrude through the orifice thereof. Surprisingly, movement of the head against the fine powder instead of the ram being moved against the fine powder provides junctions, whether between successively fed preforms or batches of loose fine powder, of sufficiently high integrity in the paste extrudate that the paste extrudate can be continuous. In that sense, the process of the present invention is a continuous paste extrusion process. Calendering of the extrudate is not required for the junctions in the extrudate to have this integrity, i.e. the cross-sectional shape of the extrudate can be maintained as such for application in the extruded form of the extrudate, e.g. rod, tube, or coating of filamentary material such as wire.

U.S. Pat. No. 3,260,774 discloses that because of the discontinuous nature of ram extrusion, indefinite lengths of extrudate are not possible (col. 2, 1. 3–7). The present invention enables indefinite lengths of extrudate to be made, without the disadvantages of the process of the '774 patent.

Another embodiment of the present invention is the paste extrusion apparatus for carrying out the paste extrusion process, comprising an extrusion barrel having an interior longitudinal passage for receiving lubricated PTFE fine powder, a ram positioned within said longitudinal passage adjacent one end thereof and in contact with said lubricated PTFE fine powder, an extrusion head positioned within said longitudinal passage at the opposite end thereof and arranged to move towards said ram and against said lubricated PTFE fine powder, said extrusion head defining an extrusion orifice, the movement of said extrusion head against said lubricated PTFE fine powder causing the extrusion of said lubricated PTFE fine powder through said extrusion orifice.

DESCRIPTION OF THE DRAWINGS

FIG. 1 is a schematic side view in cross-section of a paste extruder at the commencement of conventional paste extrusion operation.

FIGS. 2 and 3 are views of the extruder of FIG. 1 at different stages of operation.

FIG. 4 is a schematic side view in cross-section of a paste extruder operating in accordance with the present invention.

DETAILED DESCRIPTION

Figure 5:
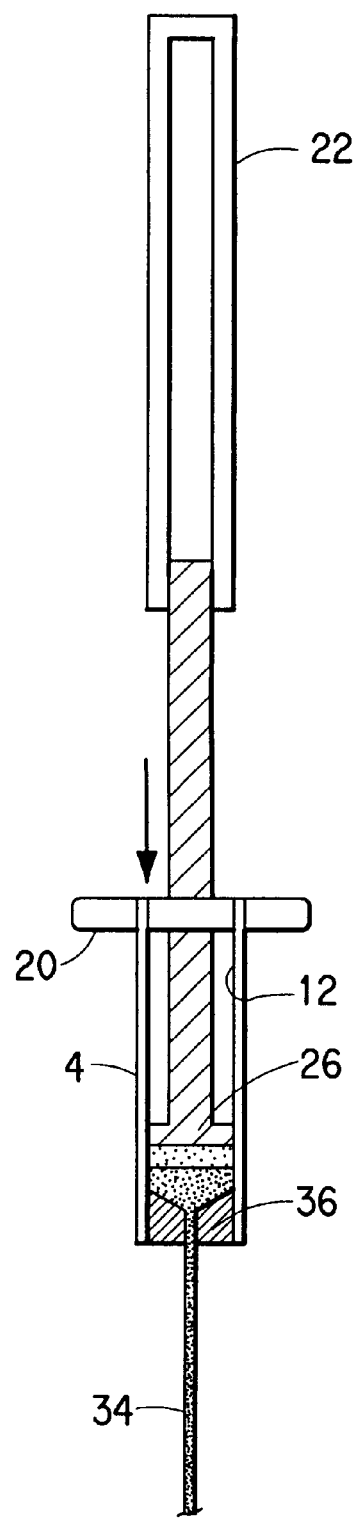
FIG. 5 is a view of the extruder of FIG. 4 at a different stage of operation in accordance with the present invention.

The PTFE fine powder used in the process of the present invention can be any paste extrudable PTFE fine powder. The PTFE has no melt flow as indicated by having a melt viscosity of at least $1 \times 10^8$ Pa.s at 372° C. and can be a homopolymer of tetrafluoroethylene (TFE) or a copolymer of TFE with a small amount of comonomer, usually less than 0.5 mol %, which modifies the properties, e.g., paste extrudability or sinterability, of the polymer. Examples of comonomer include perfluoroolefin, such as hexafluoropropylene, having from 3 to 8 carbon atoms and perfluoro(alkyl vinyl ether), wherein the alkyl group contains 1 to 8 carbon atoms, such as perfluoro(ethyl or propyl vinyl ether). The PTFE fine powder usually has a particle size in the range of 300 to 800 micrometers and the polymer of the powder is fibrillatable when subjected to shear. This fibrillation occurs as the lubricated PTFE fine powder passes through the extrusion die to give the paste extrudate sufficient unsintered strength to be handled without breaking.

The lubricant used in the present invention can also be any conventional organic paste extrusion lubricant. Examples of lubricants include those having a viscosity of at least 0.45 centipoise at 25° C., such as the saturated aliphatic and cycloaliphatic hydrocarbons that are liquid at the temperature of paste extrusion, e.g., at 20 to 150° C., and usually at ambient temperature. The lubricant preferably has a low enough boiling temperature that it can be removed from the paste extrudate merely by heating the extrudate, such at a temperature of 100 to 250° C. The paste extrudate can then be sintered. Specific examples of lubricant include a mixture of hydrocarbons of the isoparafin family available as ISO-PAR® from Exxon and Naphtha hydrocarbon solvent, a mixture of aromatic and olefinic hydrocarbons available from General Electric. Additional lubricant includes SHELLSOL® available from Shell Oil.

The lubricant and PTFE fine powder are uniformly mixed together by conventional methods such as by adding the lubricant to the powder and subjecting the powder to mild agitation, being careful not to cause the particles to stick together or shear apart to the 0.1–0.5 micrometer primary aqueous dispersion particles size. The result is that the lubricant is soaked up by the fine powder to give a dry-appearing lubricated PTFE fine powder. The amount of lubricant in the resultant fine powder will usually be from 5 to 25 wt % based on the combined weight of the PTFE fine powder and lubricant.

The paste extrusion of the present invention can best be explained by first describing conventional paste extrusion as depicted in FIGS. 1–3. FIG. 1 shows a paste extruder 2 formed from an extrusion barrel 4, a ram mechanism 6, and an extrusion head 8. In greater detail, as best shown in FIG. 2, the extrusion barrel 4 is adapted to receive a charge of lubricated PTFE fine powder, such as in the form of a cylindrical preform 10 which is complementary to the cylindrical shape of the longitudinal passage 12 within the extrusion barrel 4. The preform can be made by conventional compaction of PTFE fine powder in a mold of cylindrical shape of the dimension desired for the preform. The compaction can be carried out at ambient temperature, using such pressures as 300–500 psi (21.3–35.5 kg/cm$^2$). The preform when fed to the passage 12 in the extrusion barrel has a leading end 14 and a trailing end 16. The leading end 14 contacts the trailing end of the preceding preform to form a junction 18 between successive preform as best shown in FIG. 3. The extrusion barrel is attached to and thereby supported by a plate 20 which in turn can be mounted to a frame (not shown) for holding the paste extruder 2 in place.

The ram mechanism includes a cylinder 22. A ram 26 is mounted on the head of a piston 28 and the piston is arranged to extend from and retract into the cylinder 22, full extension being shown in FIG. 1, partial extension being shown in FIG. 3 and retraction being shown in FIG. 2. This extension and retraction can be done by conventional means such as by cylinder 22 being a hydraulic cylinder and applying hydraulic pressure to move the ram in the direction desired or to position it as desired. Alternatively, the cylinder 22 may be internally threaded to mate with a threaded piston 28. Rotation of the cylinder 22 then causes the piston to advance or retract, depending on the direction of rotation. Maintenance of the cylinder 22 stationary also causes the piston 28 and ram 26 to remain stationary.

The extrusion head 8 is fixedly mounted within the passage 12 and has an upper convex surface 30 which leads to extrusion orifice 32, through which the lubricated PTFE fine powder is extruded as a beading (rod) 34.

In operation, as shown in FIG. 1, the piston 28 and ram 26 advance into and along the passage 12 of the extrusion barrel 4 to move against the trailing end 16 of the preform to thereby force the preform, leading end first, through the extrusion orifice 34. The movement of the ram against the fine powder provides the pressure to cause the paste extrusion. FIG. 2 shows the ram 26 retracted so that preform 10 can be introduced into passage 12. FIG. 3 shows the stage of operation where ram commences movement against the trailing end of preform 10. As the ram forces preform 10 towards and through the extrusion orifice, the junction 18 also extrudes with the preform. Eventually, the ram 26 will reach the position of FIG. 1, and the cycle represented by FIGS. 2 and 3 will be repeated.

The problem is that the junction 18 extruded into the beading 34 does not have the integrity of the surrounding paste extrudate, and as such this junction portion will be cut away from the beading, or the beading from preform 10 will simply be separated from the beading from the preceding and succeeding preforms, with the result being a discontinuities in the extrudate forming process. Typically, the resultant junctions in the paste extrudate in beading or other form will have less than 25% of the strength of the surrounding paste extrudate. If the extrudate were a coating on wire, the junction would be a point of electrical insulation failure.

FIG. 4 depicts apparatus and process for overcoming this disadvantage. The elements in FIG. 4 and subsequent Figures which are the same as in FIGS. 1–3 will be numbered the same as in FIGS. 1–3. The commencement of the process of the present invention can be similar to FIG. 2 wherein a preform is loaded into the extrusion barrel. Then instead of ram 26 moving towards extrusion bead 8, ram 26 is held in a stationary position at one end of passage 12. Then as shown in FIG. 4, the extrusion head 36 moves against the lubricated PTFE fine powder, along the longitudinal axis of passage 12, towards ram 26, to cause the fine powder to extrude as beading 34 through the extrusion orifice 32 of the head 36. By the movement of head 36 instead of ram 26 causing the paste extrusion, the resultant extrusion of junction 18 as part of beading 34 gives a result in which the junction in the beading is undistinguishable from the surrounding paste extrudate. The tensile strength of the junction in the beading will be about the same as the tensile strength of the surrounding beading. If the paste extrudate were a coating on wire, the electrical performance of the junction in the coating would be indistinguishable from the surrounding paste extrudate.

FIG. 5 shows the next step in the process, namely wherein the extrusion head 36 and ram 26 move in unison to return the head 36 to its starting position at the opposite end of passage 12, with the remainder of the preform of lubricated PTFE fine powder being sandwiched between the head 36 and ram 26. This step is generally not accompanied by paste extrusion. Next, the ram 26 is retracted from the passage 12 to make room for another preform of lubricated PTFE fine powder similar to FIG. 2. The ram 26 is then brought into contact with the trailing end of the preform, and the operation shown in FIG. 4 is carried out. The movement of the extrusion head 36 back and forth in the passage can be obtained by reciprocating driving mechanism such as a hydraulic cylinder (not shown) having its piston attached to the exposed face of the head 36, offset from the extrusion orifice. A different arrangement of movable extrusion head will be shown in subsequent Figures. Generally, a clearance of 0.05 to 0.1 mm between the diameter of the extrusion head and the diameter of the passage 12 will be sufficient to permit the head to move without paste extrusion occurring between the head and the wall defining the passage.

Because of the integrity of the junctions between successive preforms which are extruded as part of the paste extrudate, the continuity of the paste extrudate does not have to be interrupted, i.e. the paste extrudate can be continuous. The paste extrusion process is interrupted to load additional lubricated PTFE fine powder into the extrusion barrel, but the continuity of the paste extrudate is not interrupted by the presence of the junctions in the paste extrudate.

The process of the present invention is also applicable to feeding the lubricated PTFE fine powder to the extrusion barrel 4 in particulate form as will be shown in subsequent Figures. As applied to FIGS. 4 and 5, the passage 12 would be filled with the particles, followed by using ram 26 to compact the particles within the passage 12, before moving the extrusion head against the compacted particles to cause their paste extrusion. The plane of contact between the ram and the particles causes a junction to be present between a successive charges of particles, much the same as between successively loaded preforms. Such junctions are also locations of weakness when conventionally paste extruded (FIGS. 1–3), and this weakness is eliminated by the process of the present invention.

Figure 6:
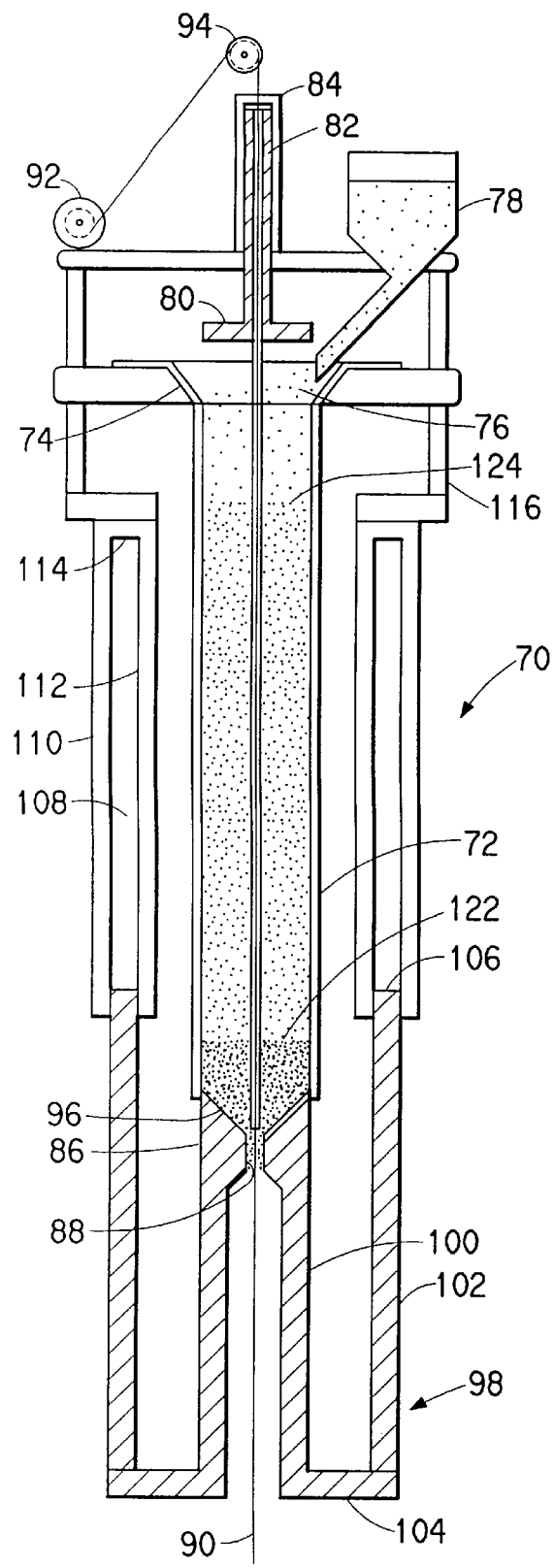
FIGS. 6, 7, and 8 are schematic side views in cross-section of another embodiment of an extruder operating in accordance with the present invention.
Figure 7:
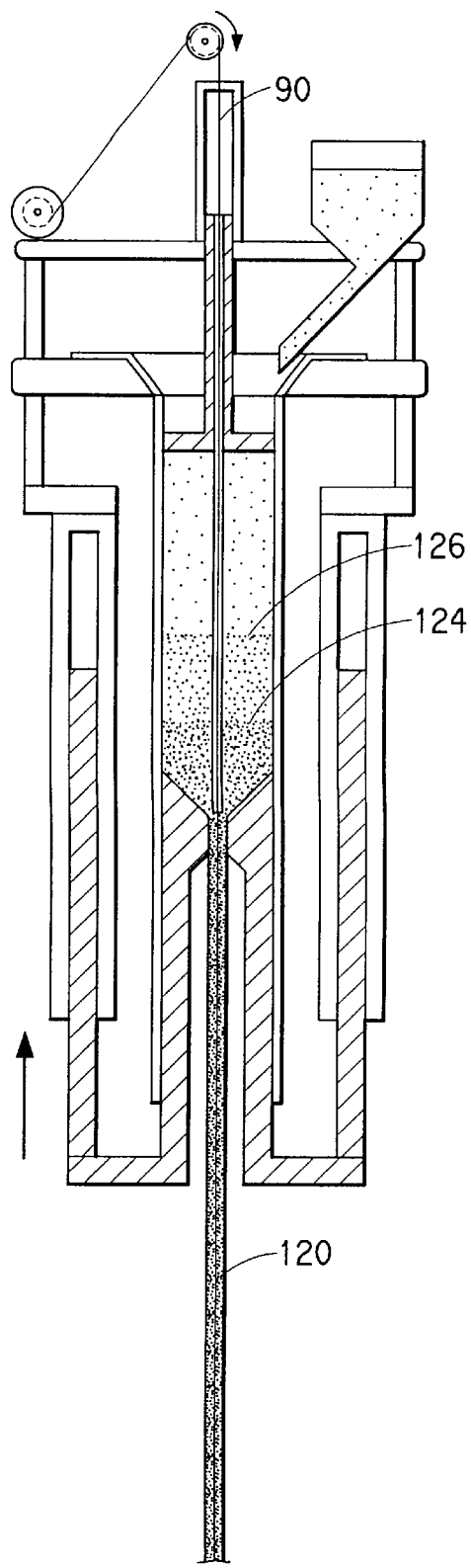
Figure 8:
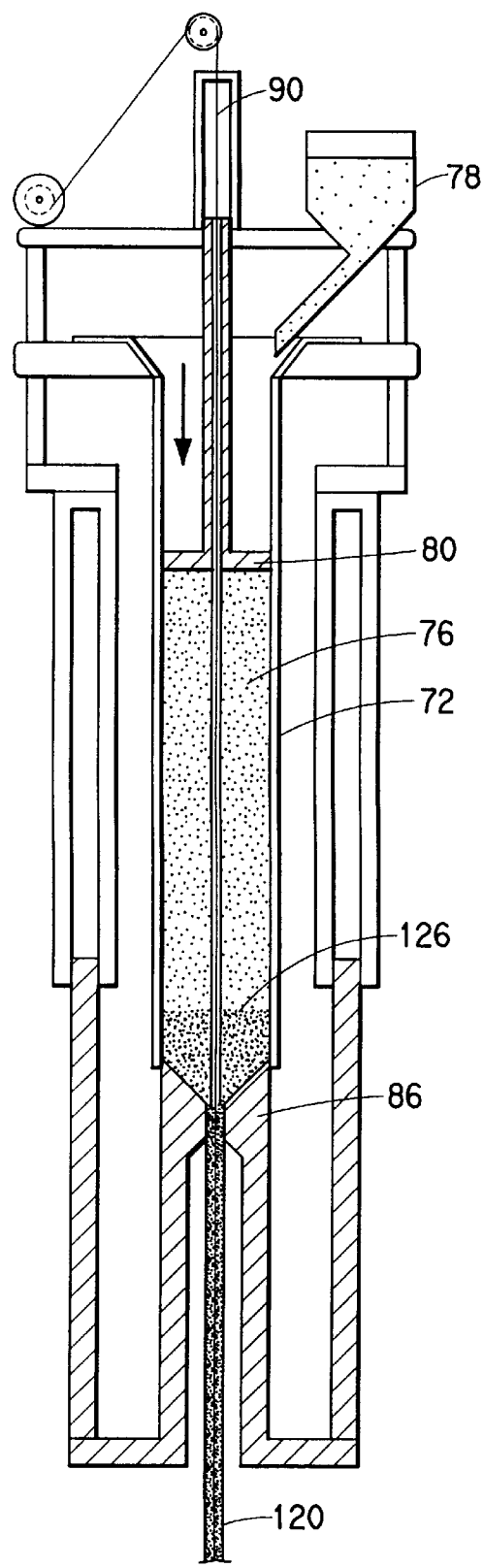

FIGS. 6–8 show the practice of the present invention using lubricated PTFE fine powder in the form of particle feed to the extrusion barrel. In FIG. 6, the paste extruder 70 comprises an extrusion barrel 72 which has conically flared inlet 74 for the powder 76. The powder is fed into the barrel 72 from a hopper 78 in a controlled batch amount by conventional means (not shown). The powder is compacted in the interior passage of the barrel 72 by ram 80 which is attached to piston 82 which is contained within housing 84. Ram 80 is shown in the retracted position. In this embodiment, the extrusion head 86 defines a central extrusion orifice 88. A wire 90 is fed from reel 92 to pulley 94 into a hole in the rear of housing 84, then along the longitudinal axes of the housing 84, through longitudinal bores in piston 82 and ram 80, and then along the longitudinal axis of the barrel 72 and out through the center of extrusion orifice 88 in the extrusion head 86 to a conventional windup (not shown).

The extrusion head has conical surface 96 which leads the powder into inlet end of the extrusion orifice of the extrusion head. The outlet end of the extrusion head is formed as an integral part of a piston 98 consisting of inner and outer concentric cylinders 100 and 102, respectively, interconnected by an annular web 104. The free end 106 of the outer cylinder is received in the annular space 108 defined by concentric cylinders 110 and 112 which are interconnected by web 114. The annular space 108 forms a guide for the outer cylinder 102 of piston 98 when the extrusion head 86 moves upwardly against the lubricated PTFE powder in the barrel 72. The web 114, conical inlet 74 and housing 84 are all connected to a frame 116.

Operation of the apparatus of FIG. 6 is shown in FIGS. 7 and 8. In FIG. 7, the ram 80 has advanced against the powder within the barrel to compact it and the ram is held stationary there by piston 82. After the ram is so positioned, the piston 98 of which the extrusion head is a part thereof is advanced towards the ram by conventional means (not shown) such as a reversible screw or a hydraulically driven piston operating on piston 98. The interior wall of the extrusion barrel 72, together with the annular space 108 provides guidance to the extrusion head 86 during this advancement. This longitudinal movement of the extrusion head 86 along the interior passage of the extrusion barrel, against the powder, causes the powder to extrude through the orifice 88 as a coating 120 on wire 90, which is passing through the orifice at the rate of extrusion of the coating. The rate at which the wire is passed through the orifice is controlled by the speed of windup of the coated wire, the windup occurring after the coated wire has been heated to remove the lubricant and the coating has been sintered.

The effect of the paste extrusion being caused by the advancement of the extrusion head against the powder in the extrusion barrel is that junctions between previously compacted powder (by ram 80) and the succeeding charge of powder is extruded by the force of the extrusion head against the powder, rather than by the force of the ram against the powder. Such junctions between charges of powder are shown by 122, 124, and 124 in FIGS. 6–8. In FIG. 8, the extrusion head has been retracted to the starting position shown in FIG. 6 to make room for additional powder, and ram 80 is shown compressing a charge of powder fed from hopper 78. Some extrusion can be done during this compression, but this extrusion should preferably stop short of extruding a junction between powder charges to the extrusion barrel, leaving that extrusion to advancement of the extrusion head against the powder as shown in FIG. 7. Thus, the extrusion carried out by this embodiment can be continuous insofar as continuity of the paste extrudate is concerned, by virtue of the integrity of the extruded junctions being as good as the surrounding extrudate. In this embodiment, the extrudate integrity would be determined by electrical testing of the insulation coating on the wire, and the junctions in this testing provide electrical performance as good as the surrounding coating.

Omission of the wire from the embodiment of FIGS. 6–8 would result in the extrudate being a beading (rod) of solid cross-section.

Figure 9:
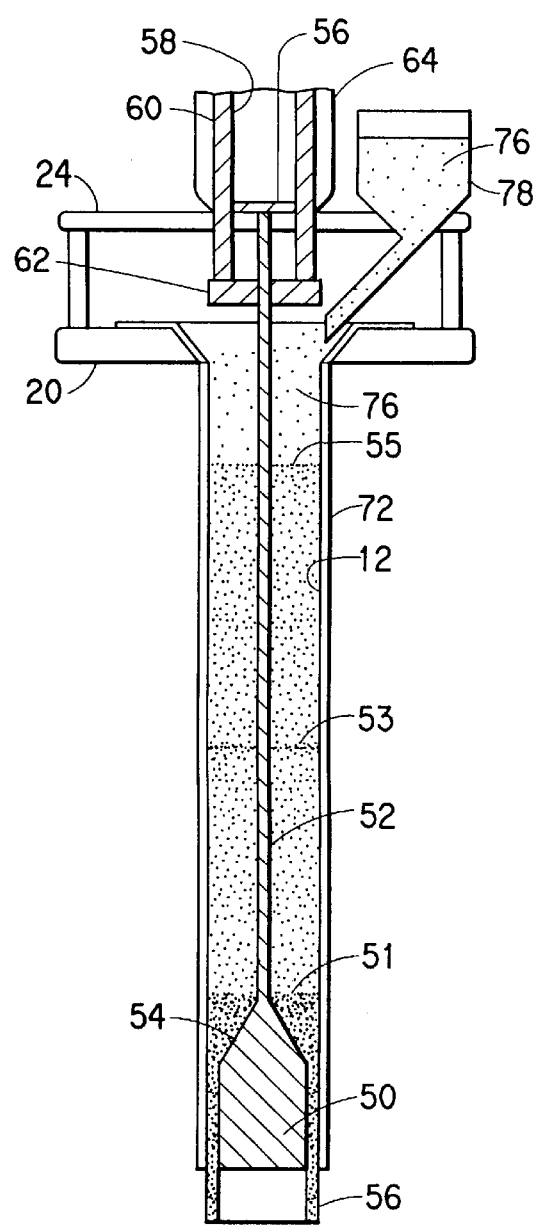
FIGS. 9, 10, and 11 are schematic side views in cross-section of another embodiment of an extruder operating in accordance with the present invention.
Figure 10:
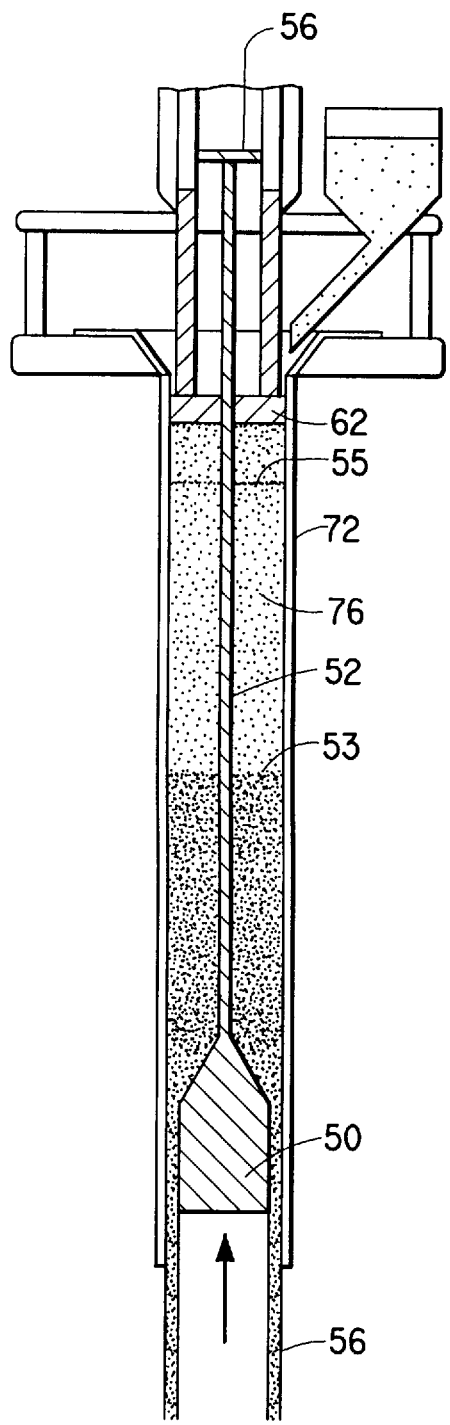
Figure 11:
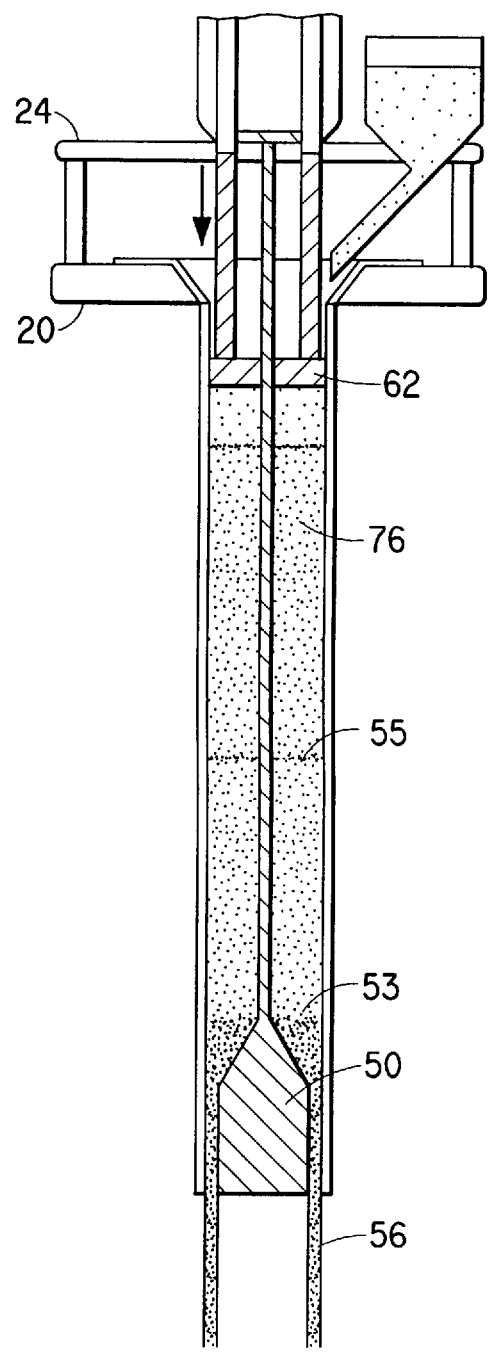

FIGS. 9–11 show an embodiment of the present invention for paste extruding tubing. In FIG. 9, the extrusion barrel 72 has longitudinal passage 12, is positioned by plate 20, and particles 76 of lubricated PTFE fine powder are fed from hopper 78 into the passage 12. The extrusion head 50 in FIG. 9 has a rod 52 extending from its upstream conical surface 54 to a piston head 56 arranged to advance and retract within bore 58 of piston 60, the leading end of which has ram 62 mounted thereto. The piston 60 is arranged to advance and retract within housing 64 which is supported by plate 24. Thus, in addition to ram 62 being movable as in the case of ram 26 in FIG. 1, extrusion head 50 is also movable along the longitudinal axis of the barrel 72 by exerting the desired pressure on piston 56 in the direction in which movement of the extrusion head is desired.

In the embodiment shown in FIG. 10, the ram 62 is positioned within the loading end of the passage 12, and the piston 56 is forced in the direction away from the ram 62 to cause the attached rod 52 to advance the extrusion head longitudinally along the interior passage 12, against the particles 76 of lubricated PTFE fine powder which is backstopped by ram 62 held stationary by piston 60, to thereby force the paste extrusion of the particles through the annular orifice to form tube 36. A series of junctions 51, 53, and 55 are present in the particles 76 of lubricated PTFE fine powder present in passage 12, each junction representing the plane of contact by the ram 62 to compact the particles fed to the passage from hopper 78. In FIG. 10, the movement of extrusion head 50 towards ram 62 causes junction 54 to paste extrude, becoming an integral part of the tube 36, having as much strength as the surrounding paste extrudate. In this embodiment the extrusion process is interrupted to enable more particles of lubricated PTFE fine powder to be fed to the extrusion barrel, but the paste extruded tubing can be continuous.

In the embodiment shown in FIG. 11, the extrusion head 50 and ram 62 move in unison to return the extrusion head to the starting position. The paste extrusion cycle can then be repeated wherein the ram 62 is retracted, permitting more particles 78 to be fed to the extrusion barrel (FIG. 9).

The ability to make continuous paste extrudate by the embodiments of FIGS. 6–11, using particles of lubricated PTFE fine powder overcomes the difficulty to achieve this result when preforms are used and the paste extrudate is tubing or coated fillamentary material such as wire. For these applications, the preform would have a central passageway to accommodate the rod corresponding to rod 52 (FIGS. 9–11) or the wire 90 (FIGS. 6–8). When the rod would be used and the paste extrudate would be tubing, the extruder would require disassembly in order to load each preform into the extrusion barrel and insertion of the rod through the central passageway in the preform. In the case of wire being coated in the paste extrusion process, the wire would have to be cut so that it could be threaded through the central passageway of the succeeding preform, and this cutting, threading would have to be done for each succeeding preform loaded into the extrusion barrel. Use of the particle feed of the lubricated PTFE fine powder in the embodiments of FIGS. 6–11 avoids the need for these procedures, and together with the achievement of junction integrity in the paste extruded tubing and coating, provides a remarkable improvement in the paste extrusion of these shapes.

The extrusion barrel, ram and extrusion head of the apparatus used in the present invention can be the same as or similar to conventional paste extrusion, with accommodation made, however, to enable to move the extrusion head back and forth along the extrusion barrel. The present invention is not limited to any particular means for carrying out this movement. The temperature of the paste extrusion can be the same as conventionally used, and preferably 20 to 40° C. By way of example, the extrusion barrel will typically be about 1000 mm in length and the diameter of its interior passage will typically be from 7.6 cm to 12.7 cm and extrusion pressures of 60 to 400 kg/cm$^2$ will typically be used. A wide range of reduction ratios (cross-sectional area of interior passage of the extrusion barrel divided by cross-sectional area of the extrusion orifice) can be used, e.g., 10:1 to 4000:1.

A lubricated PTFE fine powder was formed from Teflon® 637N polytetrafluoroethylene and lubricant which was ISO-PAR® E(Exxon), with the lubricant constituting 18 wt % of the composition. The composition was prepared by roller blending by combining the fine powder and lubricant in a glass bottle and tumbling the blend on a bottle roller. The composition was paste extruded in separate experiments as a preform (preform pressure 22 kg/cm$^2$) and as particles in accordance with the embodiments of FIGS. 4–5 and 6–11, respectively, using a reduction ratio of 15:1 and extrusion pressure of 30 kg/cm$^2$. The integrity of the junctions in the tubing and of the junctions in the wire coating were characterized by being indistinguishable from the surrounding extrudate.

What is claimed is:

1. In the process of paste extruding lubricated PTFE fine powder through an orifice defined by an extrusion head, the improvement comprising obtaining said paste extruding by moving said extrusion head against said lubricated PTFE fine powder.

2. Process of paste extruding lubricated PTFE fine powder from an extrusion barrel which terminates in an extrusion head which defines an extrusion orifice, said process comprising carrying out said paste extrusion by moving said extrusion head against said lubricated PTFE fine powder and obtaining an extrudate of said lubricated PTFE fine powder as a result thereof.

3. Process of claim 2 wherein said lubricated PTFE fine powder is provided as successive charges of lubricated PTFE fine powder to said extrusion barrel, said successive charges forming junctions between said charges within said extrusion barrel, said extruding including extruding said junctions through said extrusion orifice, whereby said junctions are indistinguishably incorporated into said extrudate, enabling said extrudate to be continuous.

4. Process of claim 2 wherein the shape of said extrudate is maintained and said extruding is continuous insofar as the continuity of said extrudate is concerned.

5. Process of claim 2 wherein said lubricated PTFE fine powder in said extrusion barrel is in the form of particles.

6. Process of claim 2 wherein said lubricated PTFE fine powder in said extrusion barrel is in the form of a preform.

7. Process of claim 2 wherein extrudate is in the form of sheet, rod, tube, or coating.

8. The process of claim 2 and passing filamentary material through said extrusion orifice during said extruding, whereby said extrudate is in the form of coating on said filamentary material wire.

9. Paste extrusion apparatus comprising an extrusion barrel having an interior longitudinal passage for receiving lubricated PTFE fine powder, a ram positioned within said passage adjacent one end thereof and in contact with said lubricated PTFE fine powder, an extrusion head positioned within said longitudinal passage at the opposite end thereof and arranged to move towards said ram and against said lubricated PTFE fine powder, said extrusion head defining an extrusion orifice, the movement of said extrusion head against said lubricated PTFE fine powder causing the extrusion of said lubricated PTFE fine powder through said extrusion orifice.

10. The paste extrusion apparatus of claim 9, wherein ram is arranged to move towards said extrusion head to compact said lubricated PTFE fine powder against said extrusion head and to move away from said extrusion head to enable said passage to receive additional of said lubricated PTFE fine powder and to remain stationary during said moving of said extrusion head towards said ram means.

* * * * *